United States Patent [19]
Esper

[11] 3,959,002
[45] May 25, 1976

[54] METHOD OF MANUFACTURING WHITE FURNACE BOATS FOR FIRING CERAMIC ARTICLES AND NOVEL FURNACE BOATS

[75] Inventor: Friedrich J. Esper, Leonberg, Germany

[73] Assignee: Robert Bosch G.m.b.H., Gerlingen-Schillerhohe, Germany

[22] Filed: May 2, 1974

[21] Appl. No.: 466,299

[30] Foreign Application Priority Data
May 10, 1973 Germany............................ 2323486

[52] U.S. Cl.................................. 106/65; 106/68
[51] Int. Cl.² ..................... C04B 35/18; C04B 35/10
[58] Field of Search................................ 106/68, 65

[56] References Cited
UNITED STATES PATENTS

| | | | |
|---|---|---|---|
| 2,895,840 | 7/1959 | Ortman................................ | 106/68 |
| 3,230,102 | 1/1966 | Miller ................................ | 106/68 X |
| 3,264,123 | 8/1966 | Alper et al........................ | 106/68 X |
| 3,269,850 | 8/1966 | Miller ................................ | 106/65 |
| 3,353,975 | 11/1967 | Shannon et al...................... | 106/65 |
| 3,464,839 | 9/1969 | Gamble............................. | 106/65 X |
| 3,591,392 | 7/1971 | Bakker.............................. | 106/65 X |
| 3,625,721 | 12/1971 | Snyder et al...................... | 106/68 X |
| 3,640,739 | 4/1972 | Bakker................................ | 106/65 |
| 3,652,307 | 3/1972 | Bakker............................. | 106/68 X |

*Primary Examiner*—Winston A. Douglas
*Assistant Examiner*—William G. Wright
*Attorney, Agent, or Firm*—Flynn & Frishauf

[57] ABSTRACT

A method for manufacturing white furnace boats which are used for firing ceramic articles at temperatures up to about 1700° C. The furnace boat is made from a mixture of between 45% and 55% of synthetic corundum having a particle size of between 1 and 2 mm, between 25% and 35% of synthetic corundum having a particle size of between 0.1 and 0.2 mm, between 5% and 20% of kaolin having a particle size of 99% under 0.06 mm and 0.1% over 0.06 mm, and between 5% and 10% of quartz having a particle size of between 0.1 and 2 mm. The product white furnace boats are $\alpha$-$Al_2O_3$ in the amount of 60% to 70%, mullite in the amount of 20% to 30%, and a glass phase together with some cristobalite in the amount of 5% to 10%.

9 Claims, No Drawings

METHOD OF MANUFACTURING WHITE FURNACE BOATS FOR FIRING CERAMIC ARTICLES AND NOVEL FURNACE BOATS

BACKGROUND OF THE INVENTION

The present invention provides a method for manufacturing ceramic articles which may be used as furnace boats in which other ceramic articles are sintered at elevated temperatures, e.g., about 1700° C.

Refractory (ceramic) furnace boats are used for sintering other ceramic articles, for example spark plug insulators. In order to have an acceptable surface life, these furnace boats must have the ability to withstand high temperatures and must also be stable under firing conditions. Furnace boats have been made from alumina, synthetic corundum, and clay which contains iron oxides and have proven to have the desired high temperature surface life. They have however the serious disadvantage that as a result of containing iron oxide they are discolored i.e. they are not white. When used as a furnace boat in direct contact with a ceramic article being sintered, the coloration of the furnace boat is transmitted to the ceramic article being sintered. In order to avoid the foregoing liners have been placed in such furnace boats to prevent direct contact between the ceramic article being sintered and the furnace boat. Such liners have been made of substances which calcine or sinter at white heat including high alumina or high corundum containing materials which include clays which are only calcined at white heat. Such furnace boats consisting of the outer boat and an inner liner are costly to manufacture and do not have as long a service life as unitary furnace boats. It has been found that the only acceptable clay for manufacturing these furnace boats was the clay which contains the iron oxide. The resultant furnace boats were discolored (brown) and it was not possible to manufacture furnace boats without using this clay with the result that the boats were discolored.

Chemical analysis of the aforesaid iron oxide containing clay determined that it contained approximately 12% of free quartz. This free quartz reacts with aluminum oxide to form mullite. Clay which contains a corresponding quantity of free quartz and is free of iron oxide has not been known i.e. is not available.

Tests to manufacture such furnace boats from iron oxide free clays or kaolin respectively, wherein free quartz of random grain distribution was added to the formulation, did not result in satisfactory boats. When the free quartz addition was of a quartz which had been very finely ground, the results also proved unsatisfactory. After use as furnace boats for about 40 firings, the boats deteriorated and were no longer useful.

SUBJECT MATTER OF THE INVENTION

The present invention provides a method for manufacturing ceramic articles and particularly white furnace boats having stable high temperature characteristics. The furnace boats are made from a mixture of between 45% and 55% of synthetic corundum having a particle size of between 1 and 2 mm, between 25% and 35% of synthetic corundum having a particle size of between 0.1 and 0.2 mm, between 5% and 20% of kaolin having a particle size of 99% under 0.06 mm and 0.1% over 0.06 mm, and between 5% and 10% of quartz having a particle size between 0.1 and 2 mm.

The aforesaid ceramic components are admixed usually with water and a binder and sometimes a wetting agent, as is conventional for admixing ceramic components before firing. They are then mixed until they form a homogeneous dough-like mass. It is then formed into the desired shape for example that of a furnace boat. Shaping is preferably carried out in a press using a compression mold of hardened steel. The shaped article is then dried in a drying furnace. The length of drying time varies depending upon the size and shape of the article and is usually between about 1 and 2 days. The article is then fired at an elevated temperature preferably in the range of 1600° to 1700° C.

The desired product is a white iron-free ceramic article, for example a furnace boat, having the following composition: about 60% to 70% of $\alpha$-$Al_2O_3$, about 20% to 30% of mullite, and about 5% to 10% of a glass phase which may include some cristobalite. The article may include up to about 0.6% by weight of impurities such as $TiO_2$, $Fe_2O_3$, CaO, alkali oxide, etc. The preferred furnace boat has a volume of open pores of about 25%. The density of the material is between 2.6 and 2.8 g/cm³.

The synthetic corundum is a fused alumina generally produced in an electric furnace. The kaolin is aluminium silicate and may be obtained from a pure clay.

The invention is further illustrated by the following example. All parts and percentages in the specification and claims are by weight unless noted otherwise.

A mixture of 52% of a synthetic corundum having a grain size between 1 and 2 mm; 28% of a synthetic corundum having a grain size of between 0.1 and 0.2 mm; 13.5% of kaolin having a particle distribution of 99.9% below 0.06 mm and 0.1% over 0.06 mm; and 6.5% of quartz having the following particle size distribution:

| | |
|---|---|
| 1.7% | over 1 mm |
| 0.6% | 0.5 to 1.0 mm |
| 0.5% | 0.3 to 0.5 mm |
| 0.7% | 0.3 to 0.4 mm |
| 1.2% | 0.2 to 0.3 mm |
| 1.8% | 0.1 to 0.2 mm | was formed with about 10% of water, 0.5 to 5 percent of a refractory binder, preferably aluminum-monophosphate, and 0.5 to 5 percent of an alkali-lignin sulfonate. A homogeneous mix was prepared in a drum mixer or another conventional mixer such as those having mixing arms after about ½ hour. The homogeneous mixture had a dough-like consistency. It was then shaped into the form of a furnace tray by pressing in a mold of hardened steel. It was then dried in a drying furnace for between 1 and 2 days and then fired for about 20 hours at 1700° C.

The chemical composition of the ceramic raw materials was about 87% $Al_2O_3$, about 13% $SiO_2$, and between about 0.2% and 0.4% of impurities such as the alkali oxides, $TiO_2$, $Fe_2O_3$, CaO, etc.

The fired furnace boat had a volume of open pores of about 25%. The material had a density of between 2.6 and 2.8 g/cm³. It had a composition within the aforesaid range of $\alpha$-$Al_2O_3$, mullite, and glass phase with cristobalite. The furnace boats were white and were used to produce spark plug insulators. Because the furnace boats were iron-free, they did not transmit color to the spark plug insulators which were fired therein. The furnace boats were found to have the desired characteristics and in tests had a service life of 100 and more firings without any damage or deterioration to the furnace boats being evident.

I claim:
1. A method for manufacturing iron-free refractory ceramic articles comprising
admixing until a homogeneous mixture is obtained
   a. between 45% and 55% of synthetic corundum having a particle size of between 1 and 2 mm;
   b. between 25% and 35% of synthetic corundum having a particle size of from between 0.1 and 0.2 mm;
   c. between 5% and 20% of kaolin having a particle size of 99.9% under 0.06 mm and 0.1% over 0.06 mm; and
   d. between 5% and 10% of quartz having a particle size of between 0.1 and 2 mm;
and then firing said homogeneous mixture at an elevated temperature to form a white furnace boat.

2. The method of claim 1 wherein said homogeneous mixture is fired in the temperature range of 1600 to 1700° C.

3. The method of claim 1 wherein said homogeneous mixture is of a dough-like consistency and contains water and a wetting agent and a binder.

4. The method of claim 3 wherein said dough-like homogeneous mass is formed into the shape of a furnace boat and then dried and fired.

5. The method of claim 4 wherein 52% of synthetic corundum having a particle size of 1 to 2 mm; 28% of synthetic corundum having a particle size of from 0.1 to 0.2 mm; 13.5% of kaolin having a particle size of 99.9% below 0.06 mm and 0.1% over 0.06 mm; and 6.5% quartz having the following particle size distribution

| | |
|---|---|
| 1.7% | over 1 mm |
| 0.6% | 0.5 to 1.0 mm |
| 0.5% | 0.3 to 0.5 mm |
| 0.7% | 0.3 to 0.4 mm |
| 1.2% | 0.2 to 0.3 mm |
| 1.8% | 0.1 to 0.2 mm | are admixed with about 10% of water and 0.5 to 5 percent of aluminum-monophosphate and 0.5 to 5 percent of alkali-lignin sulfonate to form said homogeneous mass.

6. The method of claim 1 wherein said dough-like homogeneous mass is formed into the shape of a furnace boat and then dried and fired.

7. The method of claim 2 wherein said dough-like homogeneous mass is formed into the shape of a furnace boat and then dried and fired.

8. An iron-free refractory white furnace boat produced in accordance with the process of claim 1 having good service characteristics when serving as furnace boats for sintering other ceramic articles, said iron-free refractory white furnace boat consisting essentially of between about 60% and 70% $\alpha$-$Al_2O_3$, between about 20% and 30% mullite, between about 5% and 10% of glass phase containing cristobalite, and up to about 0.6% of impurities; and having a density of between about 2.6 and 2.8 $g/cm^2$.

9. The furnace boat of claim 8 consisting essentially of about 87% $Al_2O_3$ and about 13% $SiO_2$, and containing between about 0.2% and 0.4% of impurities, wherein the amounts of $Al_2O_3$ and $SiO_2$ are present in said $\alpha$ $Al_2O_3$, mullite and glass phase.

* * * * *